Nov. 23, 1965 R. H. BROWN 3,219,361
SAFETY BELT FOR VEHICLES
Filed Nov. 23, 1964 2 Sheets-Sheet 1

INVENTOR:
ROBERT H. BROWN
BY
Harrington A. Lackey
ATTORNEY

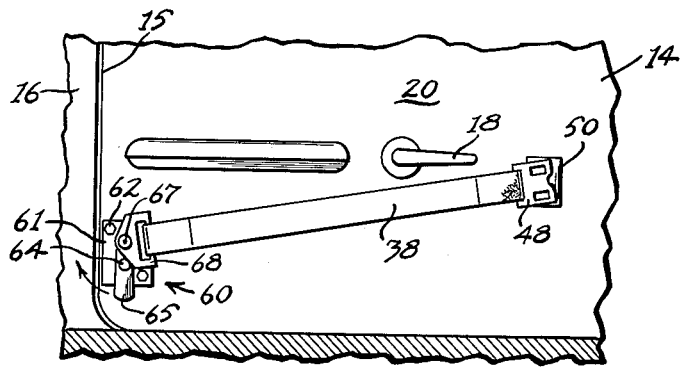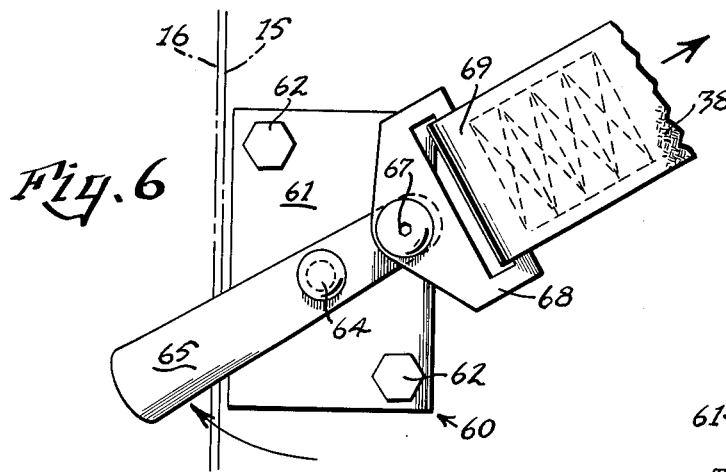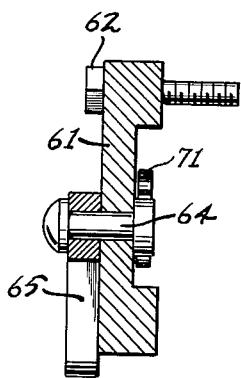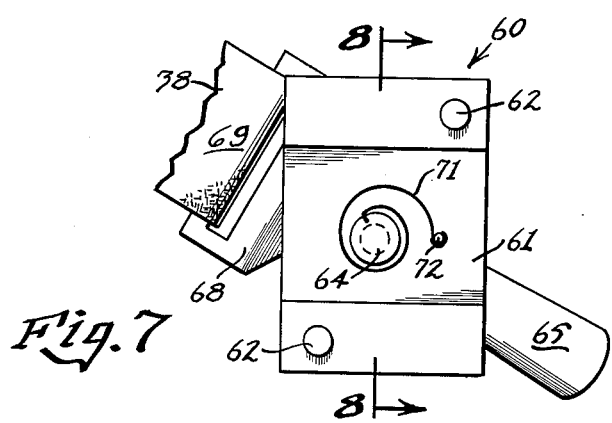

United States Patent Office 3,219,361
Patented Nov. 23, 1965

3,219,361
SAFETY BELT FOR VEHICLES
Robert H. Brown, P.O. Box 810, Pulaski, Tenn.
Filed Nov. 23, 1964, Ser. No. 412,942
7 Claims. (Cl. 280—150)

This invention relates to a safety belt for vehicles, and more particularly, to a safety belt secured to the door of a vehicle.

Although the prior art discloses the idea of a safety belt attached to a vehicle door for securing around an occupant seated in the vehicle, this invention contemplates not only a safety belt secured to the door, but also in combination with a door latching mechanism.

One object of this invention is to provide a combination vehicle safety belt and door latch mechanism, in which the operation of securing the seat belt to the occupant of the vehicle automatically actuates the door latch mechanism.

Another object of this invention is to provide a vehicle safety belt including a latching mechanism mounted on the door of the vehicle to which one strap of the belt is operatively connected.

A further object of this invention is to provide in a vehicle three separate mechanisms for securing the vehicle door in closed position.

Another object of this invention is to provide a novel safety belt for a vehicle, which not only adequately secures the occupant of the vehicle in his seat, but also affords additional insurance by maintaining the door closed, particularly in the event of an accident.

Further objects and advantages of the invention will be apparent from the following description taken in conjunction with the drawings, wherein:

FIG. 5 is a view similar to FIG. 2, showing a modification of the invention;

FIG. 6 is an enlarged fragmentary side elevation of the latch mechanism disclosed in FIG. 5;

FIG. 7 is a side elevation of the reverse side of the latch mechanism disclosed in FIG. 6; and FIG. 8 is a section taken along the line 8—8 of FIG. 7.

Figure 1:
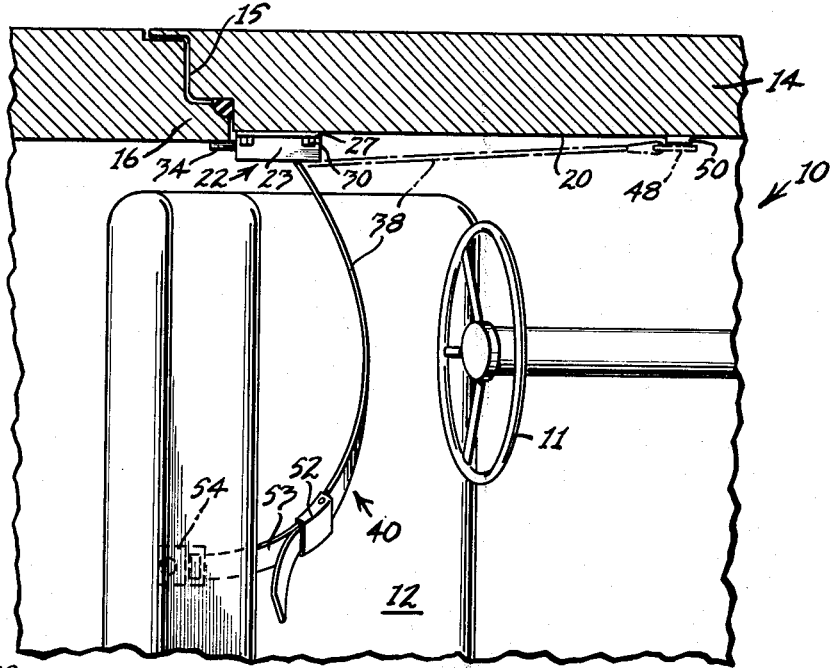
FIG. 1 is a fragmentary sectional top view of the portion of an automobile occupied by the driver, disclosing the invention in operative position.
Figures 2, 3:
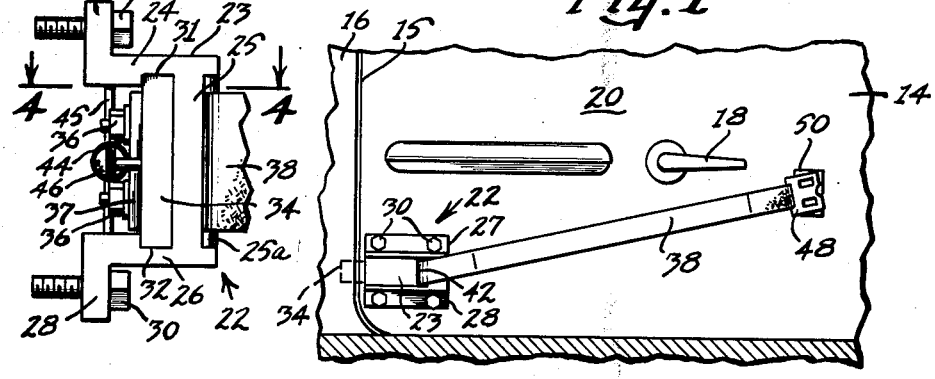
FIG. 2 is a fragmentary side elevation of the interior of the vehicle door disclosed in FIG. 1, with the invention disclosed in inoperative position.
FIG. 3 is rear end elevation of the latch mechanism, showing a portion of the outside strap.

Referring now to the drawings in more detail, FIG. 1 discloses a vehicle, such as an automobile 10, having a steering wheel 11, a front seat 12 and a left front door 14, hinged about its front end, not shown, to the body of the automobile. The rear end 15 of the door 14 is adapted to engage the door post 16 in a conventional manner, when closed. Moreover, the rear end 15 is provided with the conventional door latching mechanism, not shown, actuated by the door handle 18 (FIG. 2).

Figure 4:
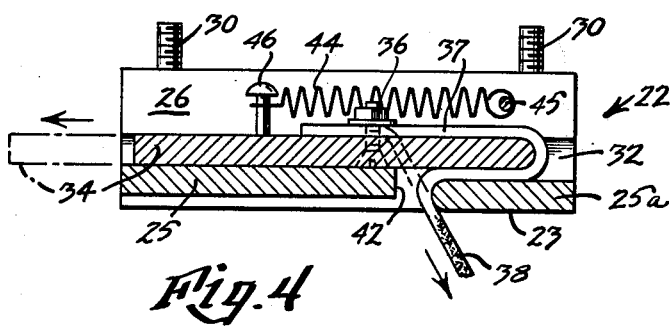
FIG. 4 is a section taken along the line 4—4 of FIG. 3.

Mounted on the lower portion of the interior panel or surface 20 of the vehicle door 14, and adjacent the rear end 15, is a latch mechanism 22. The structure of the latch mechanism 22, as best disclosed in FIGS. 3 and 4, includes an elongated housing 23 including an integral top wall 24, inside wall 25 and bottom wall 26. The top wall 24 and the bottom wall 26, are provided with flanges 27 and 28, respectively, for receiving bolts 30 to secure the housing 23 against the panel 20. The top wall 24 and bottom wall 26 are provided with opposed longitudinal recesses or tracks, 31 and 32, respectively, both of which are adjacent the inside wall 25. Slidably and reciprocably received in the tracks 31 and 32 is the latch or bolt 34.

Secured to the outer face of the bolt 34 by means of a pair of fastening members, such as nuts and bolts 36, is the outer end 37 of the outside strap 38 of safety or seat belt 40. The outside strap 38 passes around the front end of the bolt 34, then rearwardly along the inside surface of the bolt 34 and then inwardly through the slot 42 in the inside wall 25 of the housing 23. In order to accommodate the thickness of the outside strap 38, the portion 25a of the inside wall forward of the slot 42 is slightly offset inwardly, as best disclosed in FIG. 4. With the bolt 34 fully retracted within the housing 23, as disclosed in solid lines in FIG. 4, the slot 42 is located rearwardly of the front end of the bolt 34 a distance substantially equal to the desired throw of the bolt 34 to its fully extended position, disclosed in solid lines in FIG. 1 and in phantom in FIGS. 2 and 4.

In order to retract the bolt 34 and maintain it in retracted position, a coil spring 44 is secured at one end to a transverse rod 45, fixed in the opposite walls 24 and 26, and by its other end to a retaining pin 46, fixed in the outer surface of the bolt 34.

The free, or inner end 48 of the outside strap 38 is preferably formed of a magnetic material, such as steel, to engage the keeper magnet 50, mounted on the interior panel 20, when the strap is in extended inoperative position, as disclosed in FIG. 2, and in phantom in FIG. 1. The keeper 50 is spaced far enough from the latch mechanism 22 to just hold the strap 38 in extended position without exerting much tension.

For the operative position of the safety belt 40, a coupling means, such as buckle 52 is secured over the free or outer end of the inside strap 53 for coupling with the free end 48 of the outside strap 38. The inner end of the strap 53 is secured by any convenient means, such as the anchor bracket 54, to the floor or any other part of the frame of the automobile 10, in a conventional manner.

The operation of the invention as disclosed in FIGS. 1–4 is as follows:

In inoperative position, the outside strap 38 is maintained in extended position against the interior panel 20 by securing the magnetic free end 48 against the keeper 50. Thus, the strap 38 is kept out of the way of the occupant of the vehicle, yet is accessible at all times for operative use. This inoperative position is maintained whether the door 14 is open or closed. Furthermore, in the inoperative position, the bolt 34 is in its retracted position disclosed in solid lines in FIG. 4, where it is unlatched and dis-engaged from the door post 16.

After the driver is seated, and closes the vehicle door 14, he may then grasp the outside strap 38 and release the free end 48 from the magnetic keeper 50. The free end 48 is then secured to the coupling means, such as buckle 52, of the inside strap 53 and tightened for security and comfort about the body of the occupant. As the outside strap 38 is pulled away from the housing 23, the strap 38 will move inwardly through the slot 42 to pull against the forward end of the bolt 34, and thrust the bolt 34 rearwardly beyond the housing 23 and across the inside of the door post 16. The strap 38 will continue to move inwardly, until it has assumed the dashed-line position of FIG. 4, where it is straightened and therefore unable to exert any additional rearward thrust upon the bolt 34. The rearward movement of the bolt 34 stretches the spring 44 to create tension therein for retracting the bolt 34 to its original unlatched position when tension in the outside strap 38 is released. This tension in the spring 44 is sufficient not only to withdraw the bolt 34, but to withdraw the outside strap 38 back through the slot 42 and around the front end of bolt 34 to its original position disclosed in FIG. 4.

The modification disclosed in FIGS. 5–8 incorporates a different latching mechanism structure 60, but located in substantially the same position on the interior panel 20 as the latching mechanism 22. The latching mechanism 60 includes a shallow channel-shaped plate 61 secured to the interior panel 20 by means, such as bolts 62. In the center of plate 61 is a pivot pin 64 extending substantially through the middle portion of a lever bolt 65. The rear end of lever bolt 65 is long enough to extend beyond the rear end 15 of the vehicle door 14 and across the inside of the door post 16, in operative latched position, as disclosed in FIG. 6. The front end of lever bolt 65 is pivotally connected by a pin 67 to a loop member 68 secured to the outside end 69 of the outside strap 38 of the safety belt 40.

In order to retract the lever bolt 65 to its inoperative, unlatched position disclosed in FIG. 5, a spiral spring 71 may be mounted around the pivot pin 64 on the outside surface of the mounting plate 61, and connected at one end to pin 72 fixed on the plate 61, and at its other end to the pivot pin 64.

It will therefore be observed that the operation of the modified invention disclosed in FIGS. 5–8 will be substantially the same as that disclosed in FIGS. 1–4. FIG. 5 discloses the outside strap 38 mounted in inoperative position with its free end 48 magnetically secured to the keeper 50 in an extended position with little tension, against the interior panel 20, and with the lever bolt 65 in depending inoperative position, maintained by the spiral spring 71.

After the vehicle door 14 is closed, the occupant may grasp the outside strap 38, release the free end 48 from the magnetic keeper 50, and pull the strap 38 to secure it to the inside strap 53 by means of the buckle 52. By pulling the strap 38 forward or in a direction having a forward component, the loop member 68 will pivotally move the forward end of the lever bolt 65 forwardly and downwardly to rotate the rear end of the lever bolt 65 rearwardly and upwardly inside the post 15 to latched position, simultaneously creating tension in the spiral spring 71. Because of the pivotal mounting of the lever bolt 65, it will be observed that the directions for pulling the strap 38 are more limited for operating the latching mechanism 60 then for operating latching mechanism 22.

If desired, other types of keeper devices besides the magnetic type, may be employed for holding the free end 48 of the outside strap 38 against the door panel 20, such as hooks, spring-biased detents, snap fasteners, etc.

It will be observed that when the safety belt 40 is inoperative with either latch mechanism 22 or 60, not only is the occupant of the vehicle secured in his seat by the belt 40, but also the vehicle door 14 is secured closed by three different elements: first of all, the conventional door latch, not shown; secondly, the bolt 34 or lever bolt 65 secured inside the door post 16; thirdly, the belt 40, which connects the door 14 through straps 38 and 53 to the anchor bracket 54.

It will therefore be seen that in both modifications of the invention an improved and convenient safety belt has been developed, as well as a novel door latching mechanism in combination with the safety belt.

It will therefore be apparent to those skilled in the art that various changes may be made in the invention without departing from the spirit and scope thereof and therefore the invention is not limited by that which is shown in the drawings and described in the specification, but only as indicated in the appended claims.

What is claimed is:

1. A safety belt for a vehicle having a seat, and a door beside said seat, comprising:
   (a) an outside strap having an outer end and a coupling end
   (b) an inside strap having an inner end and a coupling end
   (c) coupling means for releasably securing said coupling ends,
   (d) means for fixing said inner end to said vehicle on the inside of an occupant of said seat,
   (e) a latching mechanism mounted on the inside of said door and adjacent the edge of said door for engaging said door post in latched position, when said door is closed,
   (f) means for securing the outer end of said outside strap to said latching mechanism so that a predetermined tension exerted on said outside strap will actuate said latching mechanism to a latched position, and
   (g) means for securing the coupling end of said outside strap against the inside of said door when said latching mechanism is in unlatched position.

2. The invention according to claim 1 further comprising means for automatically retracting said latching mechanism to said unlatched position when the tension in said belt is less than said predetermined tension.

3. The invention according to claim 1 in which said latching mechanism comprises a bolt mounted for reciprocable movement between said latched and unlatched positions.

4. The invention according to claim 1 in which said latching mechanism comprises a bolt, and means for mounting said bolt for pivotal movement between said latched and unlatched positions.

5. The invention according to claim 3 in which said latching mechanism comprises opposed tracks for slidably receiving said bolt, said bolt having a latching end and an opposite end, a guide slot in said latching mechanism inside and between the ends of said bolt, said outside strap passing through said slot and around said opposite end of said bolt, and means for securing the outer end of said outer strap to the outside of said bolt.

6. The invention according to claim 4 in which said pivotal mounting means comprises a pin pivotally securing said bolt to said door, said bolt having a latching end and an opposite end, the outer end of said outer strap being connected to said opposite end.

7. The invention according to claim 1 in which said means for securing the coupling end of said outside strap comprises magnetic means for engaging said coupling end.

References Cited by the Examiner

UNITED STATES PATENTS

| 2,250,014 | 7/1941 | Fitzgerald | 180—82 |
| 2,254,419 | 9/1941 | Castle | 180—82 |
| 2,815,085 | 12/1957 | Whipple | 180—82 |
| 2,848,250 | 8/1958 | Sheren | 280—150 |
| 2,855,215 | 10/1958 | Sheren | 280—150 |
| 2,858,144 | 10/1958 | Oppenheim | 280—150 |

BENJAMIN HERSH, *Primary Examiner.*